United States Patent
Takenaka

[11] Patent Number: 5,877,753
[45] Date of Patent: Mar. 2, 1999

[54] ELECTRONIC APPARATUS HAVING A SCHEDULE MANAGEMENT FUNCTION

[75] Inventor: Yuko Takenaka, Yamatokoriyama, Japan

[73] Assignee: Sharp Kabushiki Kaisha, Osaka, Japan

[21] Appl. No.: 542,353

[22] Filed: Oct. 12, 1995

[30] Foreign Application Priority Data

Oct. 17, 1994 [JP] Japan ..................................... 6-250702

[51] Int. Cl.⁶ ...................................... G09G 5/22
[52] U.S. Cl. ........................... 345/192; 345/468; 345/501
[58] Field of Search ..................... 345/146, 501, 345/468, 469, 471, 192–194; 395/601, 603, 606; 368/28–30, 41; 707/1, 3, 6

[56] References Cited

U.S. PATENT DOCUMENTS 5,199,104  3/1993  Hirayama ................................. 345/445
5,530,684  6/1996  Kataoka et al. .......................... 368/41

Primary Examiner—Kee M. Tung
Attorney, Agent, or Firm—Nixon & Vanderhye PC

[57] ABSTRACT

An electronic apparatus of the present invention includes: a storage unit for storing data having time data; a retrieval word input unit for inputting a retrieval word having an expression representing at least a period of time in order to retrieve the data stored in the storage area; a conversion unit for converting the retrieval word into date information; a comparison unit for comparing the date information with the time data; and a display unit for displaying data having time data which matches with the date information.

7 Claims, 6 Drawing Sheets

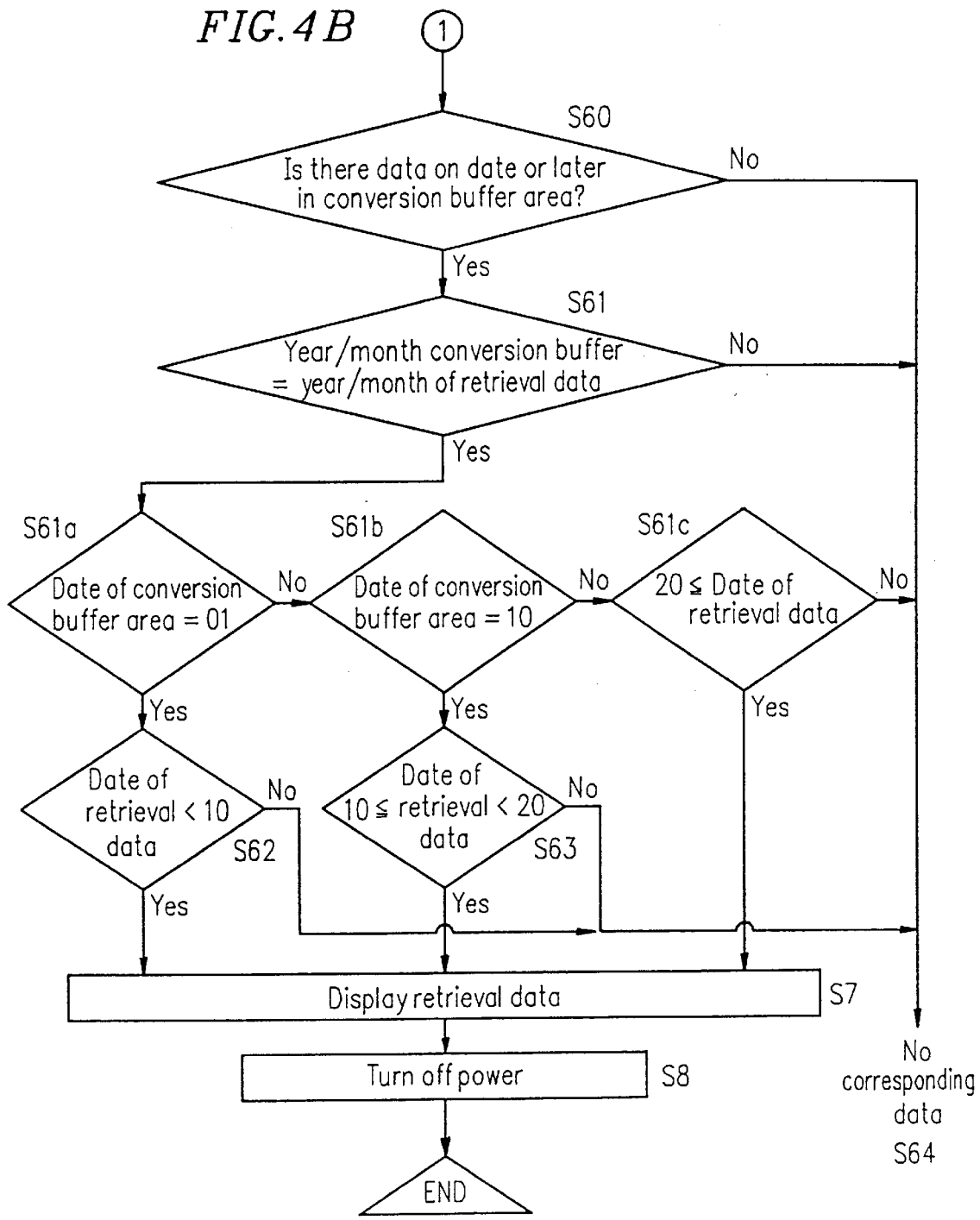

*FIG. 5A*

```
October 10th, 1994  ( Monday )

▶ Early August
```

*FIG. 5B*

```
August 2nd, 1994  ( Tuesday )
    9 : 30 AM
 In-section meeting
```

*FIG. 5C*

```
        No data
```

ELECTRONIC APPARATUS HAVING A SCHEDULE MANAGEMENT FUNCTION

BACKGROUND OF THE INVENTION

1. Field of the Invention

The present invention relates to an electronic apparatus equipped with a schedule management function, such as an electronic organizer, small electronic equipment (e.g., a portable information terminal), and a personal computer.

2. Description of the Related Art

In the case where stored schedule data including time data is read and displayed in conventional electronic apparatuses equipped with a schedule management function, a user inputs date information such as a year/month/day to the conventional electronic apparatuses, and schedule data corresponding to the date information is read and displayed.

However, in conventional electronic apparatuses, only schedule data on a specified date is read, and schedule data on a certain period of time cannot be read. Thus, the conventional electronic apparatuses lack general versatility, causing inconvenience.

SUMMARY OF THE INVENTION

The electronic apparatus of the present invention, includes: storage means for storing a plurality of data, each of the plurality of the data including time data representing time; retrieval word input means for inputting a retrieval word having at least an expression representing a period of time in order to retrieve at least one of the plurality of data stored in the storage means; conversion means for converting the retrieval word into period data representing the period of time; comparing means for comparing the period data with the time data, and retrieving at least one data including time data representing time belong to the period of time of the input retrieval word; and display means for displaying the retrieved data.

In one embodiment of the present invention, the expression representing the first period of time is at least one of the group of words consisting of "early", "mid", and "late".

In another embodiment of the present invention, the retrieval word includes at least one number.

In another embodiment of the present invention, the conversion portion comprises a character storing area for storing the retrieval word, a date storing area for storing a transaction code information representing the period of time corresponding to the retrieval word, and a conversion storing area for storing information obtained by converting the transaction code information.

In another embodiment of the present invention, the expression representing the period of time is at least one of a 1st (first) week, a 2nd (second) week, a 3rd (third) week, a 4th (fourth) week, and a 5th (fifth) week.

Thus, the invention described herein makes possible the advantage of providing an easy-to-use electronic apparatus capable of displaying data containing time sequence data, using a retrieval word which is not in year/month/day format.

This and other advantages of the present invention will become apparent to those skilled in the art upon reading and understanding the following detailed description with reference to the accompanying figures.

BRIEF DESCRIPTION OF THE DRAWINGS

FIGS. 4A and 4B show a flow chart illustrating the retrieval of schedule data according to the present invention.

FIGS. 5A through 5C are diagrams each illustrating a display screen.

DESCRIPTION OF THE PREFERRED EMBODIMENTS

Figure 1:
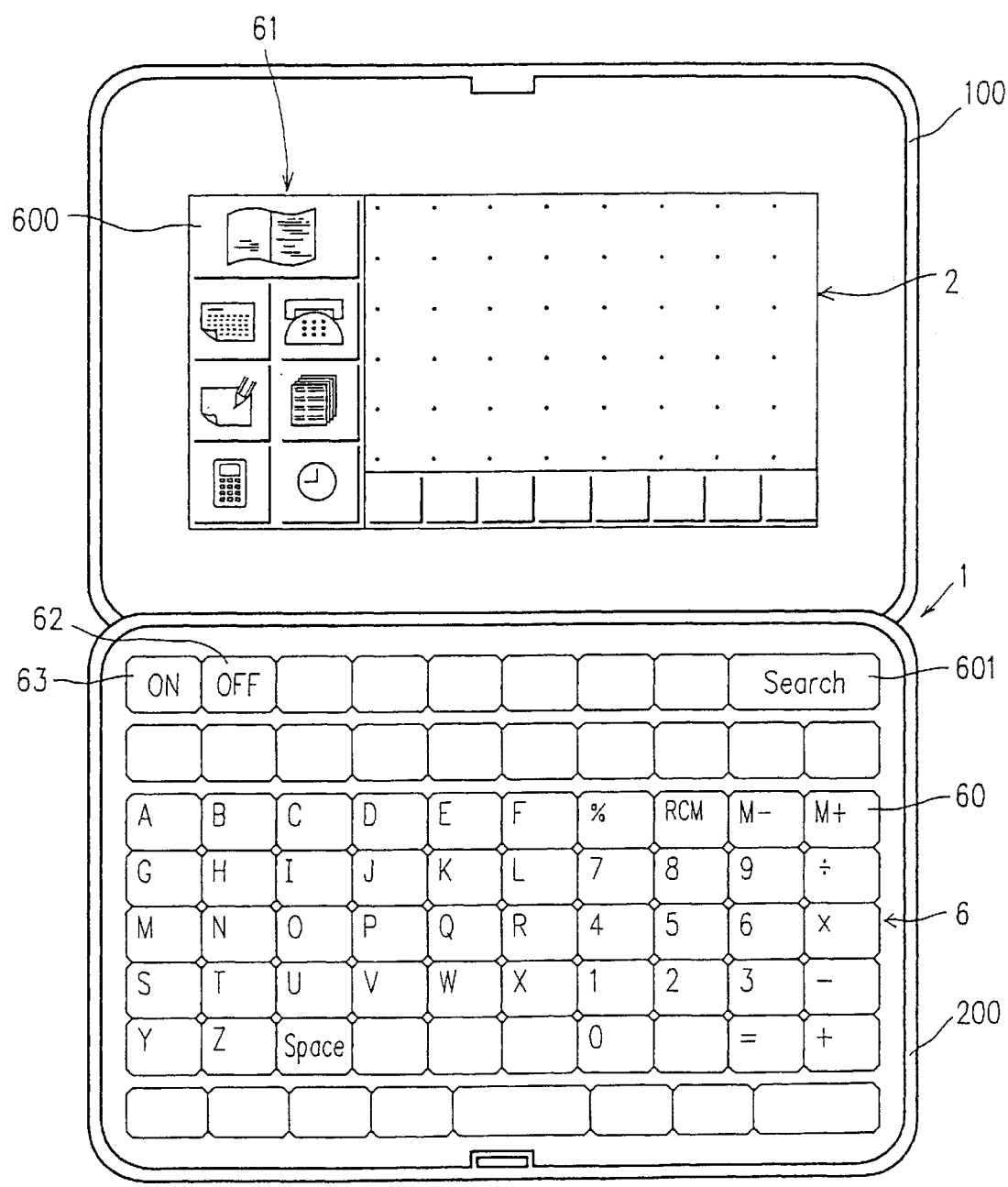
FIG. 1 is a plan view of an electronic apparatus of the present invention.

FIG. 1 is a plan view of an example of an electronic apparatus according to the present invention. Referring to FIG. 1, a structure of the example of the electronic apparatus according to the present invention will be described.

A main body 1 of the apparatus includes two housings: an upper section 100 and a lower section 200. The upper section 100 has a display portion 2 displaying data contents, messages, and operational results. The upper section 100 and the lower section 200 have a plurality of input keys for inputting various information.

The input portion 6 includes a plurality of data input keys 60 for inputting textual information and numerical information used in each application implemented in the apparatus, mode setting keys 61 for setting a mode of the apparatus, an OFF key 62 for turning off a power source of the main body 1, an ON key 63 for turning on the power source of the main body 1, and a search key 601 for retrieving data stored in the apparatus. The apparatus includes a calendar mode, a schedule mode, an address notebook mode, a telephone book mode, a memorandum mode, a calculation mode, and a clock mode. In this way, the apparatus has a plurality of modes, and these modes are selected by the mode setting keys 61 corresponding to the respective modes. The schedule mode is set by a schedule mode key 600.

Figure 2:
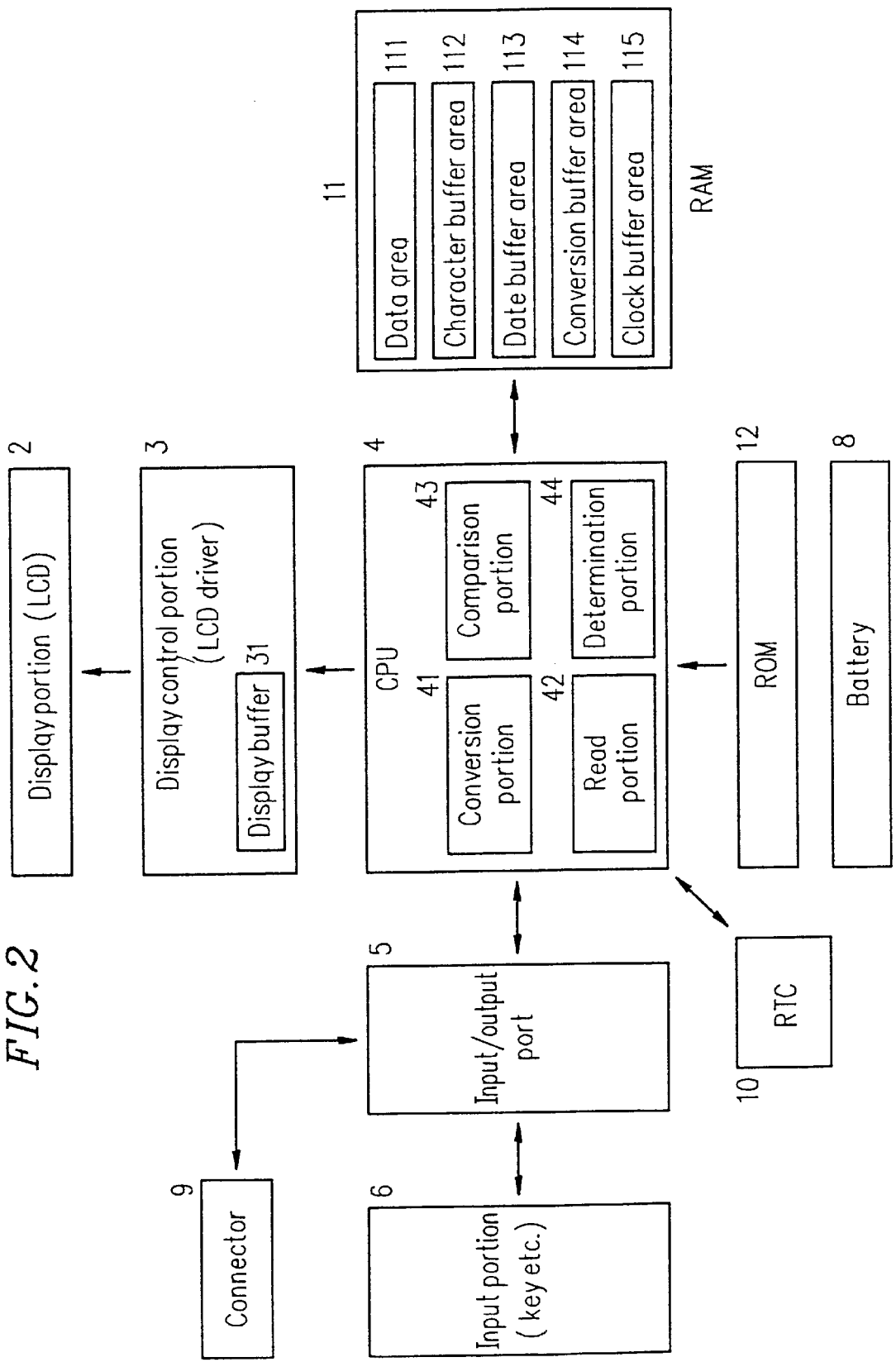
FIG. 2 is a block diagram of the electronic apparatus of the present invention.

FIG. 2 is a block diagram of the example of the electronic apparatus according to the present invention. Referring to FIG. 2, an inner structure of the example of the apparatus according to the present invention will be described.

A CPU 4 controls each of circuits included in the apparatus. The display portion 2 is a liquid crystal display (hereinafter, referred to as an LCD), for example, having a dot matrix structure. By writing display data into a display buffer 31 of a display control portion (hereinafter, referred to as an LCD driver) 3 based on a control signal from the CPU 4, display data (operational results, messages, etc.) is displayed. An input signal input from the input portion 6 is input into the CPU 4 through an input/output port 5. The CPU 4 processes the input signal and determines which key is input based on the input signal. A real time clock (hereinafter, referred to as an RTC) 10 provides real time.

A ROM 12 stores data and program required for the respective modes such as those of calendar, schedule, address notebook, telephone book, memorandum, calculation, and clock.

A RAM 11 includes a data area 111 for storing date information input into the main body 1, a character buffer area 112 for storing textual codes of the input date information, a date buffer area 113 for storing transaction codes so as to subject the textual codes stored in the character buffer area 112 to a conversion processing, a conversion buffer area 114 for storing period data, and a clock buffer area 115 for reading a year/month/day set in the RTC 10 and storing the read year/month/day. The period data is used so as to retrieve a schedule data. The schedule data includes a plan content and time data. The plan content represents what matter is executed. The time data represents time at which the plane is executed. In other words, the time refers to a time when the matter is to be executed.

When the ON key 63 is pressed, the electric power of a battery 8 is supplied to the display portion 2, the LCD driver 3, the CPU 4, the input/output port 5, the input portion 6, a connector 9, the RTC 10, the RAM 11, and the ROM 12. When the OFF key 62 is pressed, an OFF current for maintaining a waiting state flows through the LCD driver 3, the CPU 4, the input portion 6, the RTC 10, the RAM 11, and the ROM 12, and the current is not supplied to the other portions. In particular, it is required that an OFF current flows through the RAM 11 so as to keep stored data.

Figure 3A:
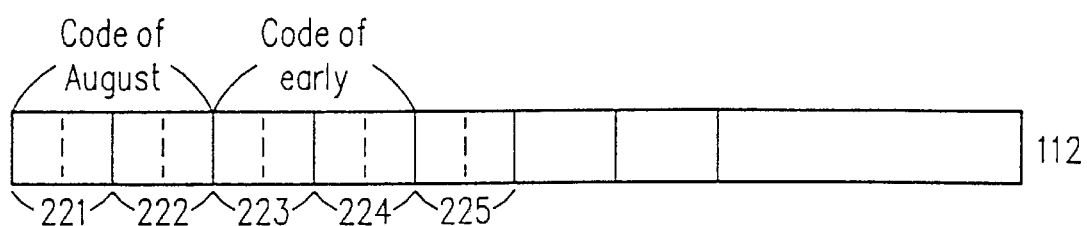
FIGS. 3A through 3C are views each showing a state of a buffer in a RAM.
Figure 3B:
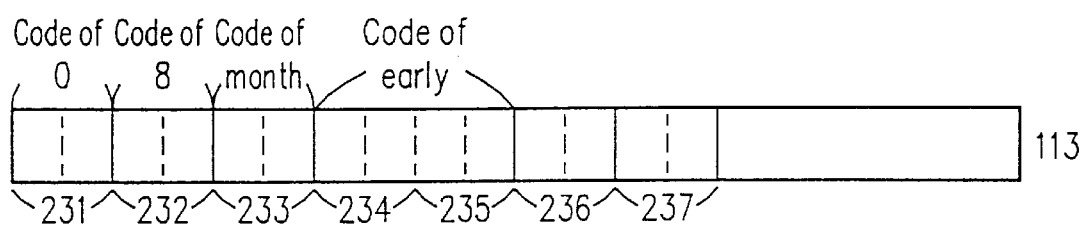
Figure 3C:
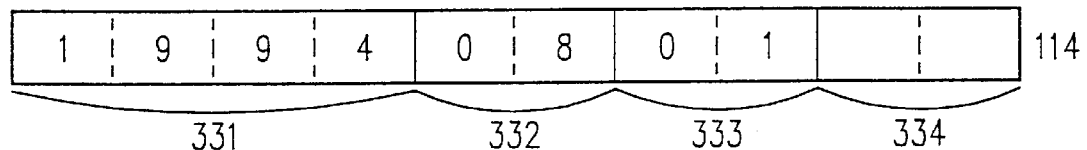
Figure 4A:
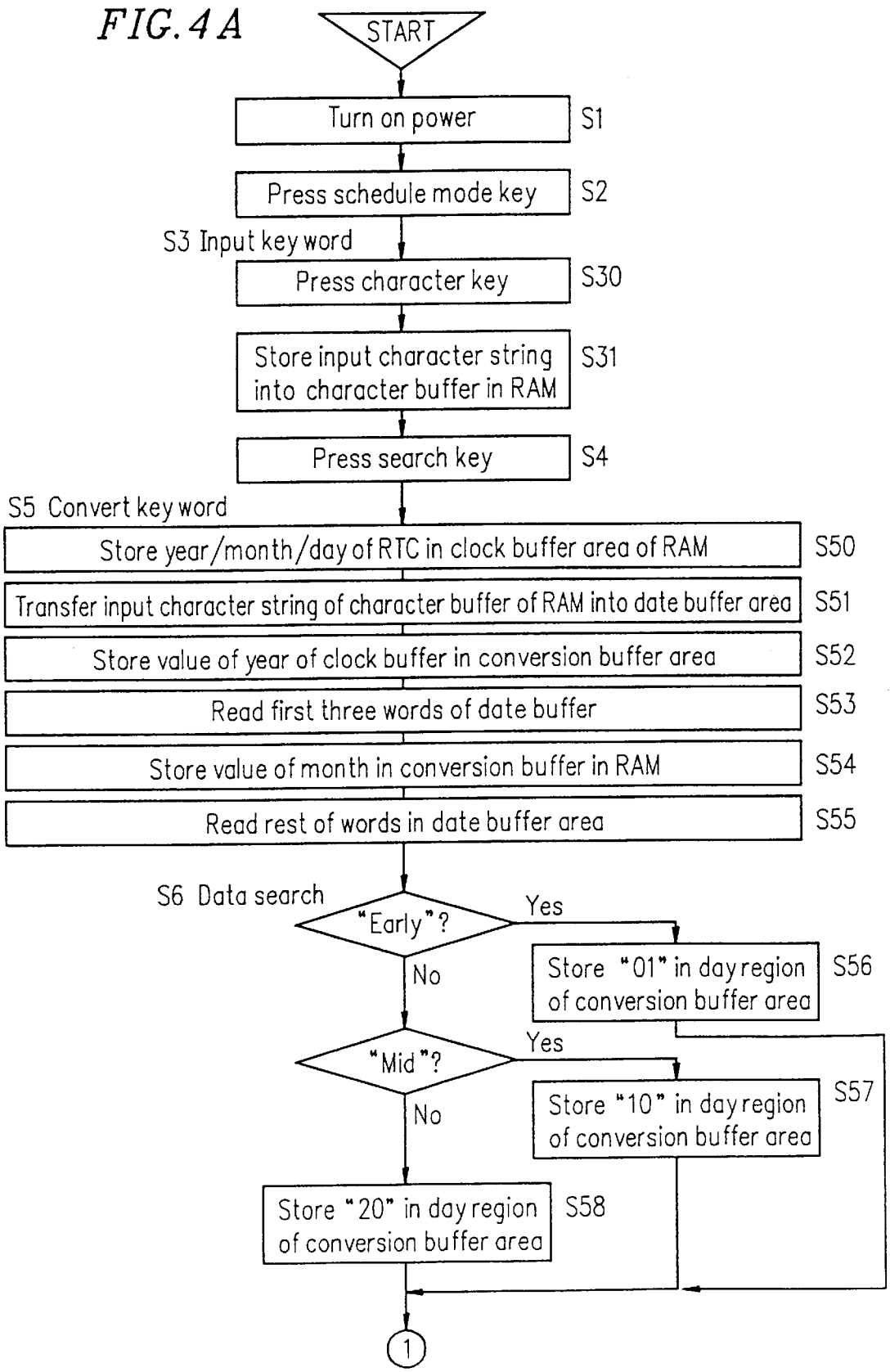

The case where a key word included in the input data for retrieving schedule data is input from the input portion 6 will be described with reference to FIGS. 3A through 3C. FIGS. 3A through 3C respectively show a state of a buffer in the RAM 11. The input data input from the input portion 6 is stored in the character buffer area 112 as textual codes, as shown in FIG. 3A. Then, these codes are transferred to the date buffer area 113, as shown in FIG. 3B. These textual codes are subjected to a conversion processing as follows: In the case of a one-digit month (i.e., January through September), a code indicating 0 is stored in a region 231 followed by storing of a code of the one-digit month in a region 232. These codes are converted into the transaction codes. This is because data is more easily managed when stored in a two-digit fixed-length.

As shown in FIG. 3C, a period data is stored in the conversion buffer area 114. When the input data does not include year information, year information is read from the clock buffer area 115, and the year information is stored in a region 331. When the input data includes year information (not shown), the year information is stored in the region 331. A region 332 stores month information of the input date, and a region 333 stores date information of the input date.

In the case where the input data includes time information, the time information is stored in regions 225, 236, 237, and 334 after the regions storing date information of the input date. In this case, the time information to be input into the regions 236 and 337 is described in 24 hours. For example, in the case of 1 a.m., a code indicating 0 is stored in the region 236, and a code indicating 1 is stored in the region 237. In the case of 1 p.m., a code indicating 1 is stored in the region 236, and a code indicating 3 is stored in the region 237. This is because data is more easily managed when stored in a two-digit fixed length.

The case where schedule data is read by using a key word included in the input data in the schedule mode will be described with reference to FIGS. 4A, 4B, 5A, 5B and 5C.

In this example, when "early MM month" is input as a key word, schedule data of 1st to 9th day of the MM month is retrieved; when "mid-MM month" is input as a key word, schedule data of 10th to 19th day of the MM month is retrieved; and when "late MM month" is input as a key word, schedule data of 20th day and later of the MM month is retrieved.

A user operates the ON key 63 to turn on the power (Step S1). The schedule mode key 600 is pressed to put the apparatus in the schedule mode (Step S2).

Then, the input data, such as a retrieval word, is input so as to retrieve a schedule data stored in the electronic apparatus (Step S3). In Step S3, the user inputs the input data by using a group of data input keys 60 (Step S30). Here, as an example, it is assumed that "early August" is input as a key word included in the input data. As shown in FIGS. 5A through 5C, the input key word is displayed on a display screen. Textual codes of the input key word are stored in the character buffer area 112 (Step S31) as shown in FIG. 3A.

Next, when the search key 601 is pressed (Step S4), the key word "early August" is converted into period data for date retrieval by a conversion portion 41 of the CPU 4 (Step S5).

A read portion 42 of the CPU 4 stores a current year/month/day set in the RTC 10 in the clock buffer area 115 (Step S50). Then, the textual codes of the key word stored in the character buffer area 112 in the RAM 11 are transferred to the date buffer area 113 (Step S51). At this time, as shown in FIG. 3B, in the case of a one-digit month, the number of digits is adjusted by adding a code of "0" before the code of "8". The value of a year of the year/month/day stored in the clock buffer area 115 is stored in a year region 331 of the conversion buffer area 114 (Step S52). The first three words of a character string stored in the regions 231, 232, and 233, i.e., month information stored in the date buffer portion 113 is read (Step S53) and is stored in a month region 332 of the conversion buffer area 114 of the RAM 11. The last transaction codes are read from the regions 234 and 235 of the date buffer area 113 (Step S55). The last transaction codes are converted and are stored in a date region 333.

In the case where "early" is input to the electronic apparatus, "01" is stored in the day region 333 of the conversion buffer area 114 (Step S56). In the case where "mid" is input to the electronic apparatus, "10" is stored in the day region 333 of the conversion buffer area 114 (Step S57). In the case where "late" is input to the electronic apparatus, "20" is stored in the day region 333 of the conversion buffer area 114 (Step S58). Thus, the conversion of the input key word. from the character string format into the year/month/day format is completed.

Next, in Step S6, the year/month/day stored in the conversion buffer area 114 of the RAM 11 is compared with the year/month/day of the schedule data stored in the data area 111 of the RAM 11 by a comparison portion 43 of the CPU 4, whereby retrieving a information of whether or not the corresponding data is present is retrieved.

First, the CPU 4 retrieves whether or not schedule data corresponding to the date later than that indicated by the period data stored in the conversion buffer area 114 is present (Step S60). If no corresponding data is present (NO), a determination portion 44 of the CPU 4 determines the absence of corresponding data and allows a message to be displayed as shown in FIG. 5C (Step S64).

If corresponding data is present (YES), year/month information of the period data stored in the conversion buffer area 114 is compared with year/month information of a data portion included in the schedule data (Step S61). In the case where the corresponding data is not present (No), the determination portion 44 of the CPU 4 determines the absence of the corresponding data (Step S64). When the year/month information of the conversion buffer area 114 is identical with the year/month information of the data portion included in the schedule data, the step proceeds to YES (Step S61a). In this case, the following processing is performed.

In Step S61a, when the day information of the period data stored in the conversion buffer area 114 is "01", the CPU 4 allows the processing to proceed to Step S62. In Step S62, whether or not day information of the data portion included in the schedule data is less than 10 is searched. When the day information is less than 10, the schedule data corresponding to the day information is displayed as shown in FIG. 5B (Step S7). When the day information is 10 or more, the processing proceeds to Step S64. In the case where the day information stored in the conversion buffer area 114 is not "01", the processing proceeds to Step S61*b*.

In Step S61*b*, when the day information stored in the conversion buffer area 114 is "10", the CPU 4 allows the processing to proceed to Step 563. In Step 563, whether of not the day information of the data portion included in the schedule data is less than 20 is searched. In Step S63, in the case where the day information is 10 or more and less than 20, the schedule data corresponding to the day information is determined by the determination portion 44 of the CPU 4, and a display of the schedule data corresponding to the day information is performed as shown in FIG. 5B (Step S7). In the case where the day information is 10 less than 10 and 20 or more, the processing proceeds to Step S64. In the case where the day information stored in the conversion buffer area 114 is not "10", the processing proceeds to Step S61*c*.

In the step S61*c*, when the day information of the data portion included in the schedule data is "20 or more", whether or not the day information of the schedule data is 20 or more is searched. The schedule data corresponding to the day information is determined by the determination portion 44 of the CPU 4, and a display of the schedule data corresponding to the day information is performed as shown in FIG. 5B (Step S7).

Finally, the power is turned off by using the OFF key, whereby the operation of the main body 1 of the apparatus is terminated (Step S8).

In this example, as described above, "early MM month", "mid MM month", and "late MM month" can be used as a key word to be input. Furthermore, "the first half of an MM month or a YYYY year", "the second half of an MM month or a YYYY year", "the beginning of an MM month", and "the end of an MM month" can be used as a key word. For example, "the first half of an MM month" refers to the 1st to the 15th days, "the second half of an MM month" the 16th day or later, "the beginning of an MM month" the 5th day or earlier, and "the end of an MM month" the 25th day or later. Furthermore, schedule in the morning or the afternoon on a specified day can be read by inputting "a.m. of a Dth day" or "p.m. of a Dth day" as a key word. When a key word representing season such as "spring in a YYYY year" is input, schedule data of, for example, March, April, and May in the YYYY year can be read. Likely, when "summer in a YYYY year" is input as a key word, schedule data of, for example, June, July, and August in the YYYY year can be read; when "autumn in a YYYY year" is input as a key word, schedule data of, for example, September, October, and November in the YYYY year can be read; and when "winter in a YYYY year" is input as a key word, schedule data of, for example, December, January, and February in the YYYY year can be read. As a key word used in the example, an expression representing a certain period of time without any numbers (0, 1, 2,. . ., 7, 8, 9), i.e., "expression (word(s)) indicating a period" suffices. However, as exceptions, it is noted that the retrieval word used by a example of electronic apparatus according to the present invention includes the expressions "the 1st week" through "5th week".

When schedule data is retrieved, the retrieval word can include at least one number such as 8 month.

In this example, for the purpose of retrieving schedule data stored in storing means, a word representing a period of time is input as a retrieval word (data). The input word is converted into period data. The period data is compared with time data of the schedule data stored in the storing means. Based on the comparison, the schedule data containing the time data representing time which belongs to the period of time is displayed. Therefore, an ease-of-use electronic apparatus capable of displaying the schedule data containing the time data using the retrieval word.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electronic apparatus comprising:
   storage means for storing a plurality of data, each of the plurality of data including time data representing time;
   retrieval word input means for inputting a retrieval word having at least an expression representing a period of time in order to retrieve at least one of the plurality of data stored in the storage means, wherein said expression represents first and second parts, said first part including at least one of the group of words specifying early, mid and late, and said second part including at least one word specifying a day, week, month or year;
   conversion means for converting the retrieval word into period data representing the period of time;
   comparing means for comparing the period data with the time data, and retrieving at least one data including time data representing time within the period of time of the input retrieval word; and
   display means for displaying the retrieved data.

2. An electronic apparatus according to claim 1, wherein the retrieval word has at least one number.

3. An electronic apparatus according to claim 1, wherein the conversion means comprises a character storing area for storing the retrieval word, a date storing area for storing a transaction code information representing the period of time corresponding to the retrieval word, and a conversion storing area for storing information obtained by converting the transaction code information.

4. An electronic apparatus according to claim 1, wherein the expression representing the first period of time is at least one of a first week, a second week, a third week, a fourth week, and a fifth week.

5. An electronic apparatus comprising:
   storage means for storing a plurality of data, each of the plurality of data including time data representing time;
   retrieval word input means for inputting a retrieval word having at least an expression representing a period of time in order to retrieve at least one of the plurality of data stored in the storage means;
   conversion means for converting the retrieval word into period data representing the period of time, said conversion means including a character storing area for storing the retrieval word, a date storing area for storing transaction code information representing the period of time corresponding to the retrieval word, and a conversion storing area for storing information obtained by converting the transaction code information;
   comparing means for comparing the period data with the time data, and retrieving at least one data including time data representing time within the period of time of the input retrieval word; and
   display means for displaying the retrieving data.

6. A method for storing, retrieving, and displaying schedule management information, comprising the steps of:

storing a plurality of data in a memory, each of said plurality of data including time data representing time;

inputting a retrieval word having at least an expression representing a period of time for retrieval of at least one of the plurality of data stored in said memory, wherein said expression represents first and second parts said first part including at least one of the group of words specifying early, mid and late, and said second part including at least one word specifying a day, weeks month or year;

converting the retrieval word into period data representing the period of time;

comparing the period data with said time data and retrieving at least one data including time data representing time within the period of time of the input retrieval word; and displaying the retrieved data.

7. The method of claim 6, wherein the retrieval word has at least one number.

* * * * *